(12) United States Patent
Aldossary et al.

(10) Patent No.: US 10,911,411 B2
(45) Date of Patent: Feb. 2, 2021

(54) EXTENDING PUBLIC WIFI HOTSPOT TO PRIVATE ENTERPRISE NETWORK

(71) Applicant: Saudi Arabian Oil Company, Dhahran (SA)

(72) Inventors: Abdullah A. Aldossary, Khobar (SA); Ahmad A. Alharbi, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 179 days.

(21) Appl. No.: 16/166,768

(22) Filed: Oct. 22, 2018

(65) Prior Publication Data

US 2020/0127972 A1    Apr. 23, 2020

(51) Int. Cl.
  *H04L 29/12* (2006.01)
  *H04L 29/06* (2006.01)

(52) U.S. Cl.
  CPC ........ *H04L 63/029* (2013.01); *H04L 61/2015* (2013.01); *H04L 63/0209* (2013.01); *H04L 63/0272* (2013.01); *H04L 63/0892* (2013.01); *H04L 65/102* (2013.01); *H04L 69/164* (2013.01)

(58) Field of Classification Search
  CPC ............... H04L 63/029; H04L 63/0209; H04L 63/0272; H04L 63/0892; H04L 61/2015; H04L 65/102; H04L 69/164; H04W 12/0808; H04W 84/12
  See application file for complete search history.

(56) References Cited

U.S. PATENT DOCUMENTS

| 5,828,666 A | 10/1998 | Focsaneanu et al. |
| 6,571,221 B1 | 5/2003 | Stewart et al. |
| 8,041,824 B1 | 10/2011 | Maeng |
| RE45,131 E | 9/2014 | Stewart et al. |
| 9,629,060 B2 | 4/2017 | Arora et al. |
| 9,992,705 B2 | 6/2018 | Sanka et al. |
| 2010/0182983 A1* | 7/2010 | Herscovici ............ H04W 24/00 370/338 |

(Continued)

FOREIGN PATENT DOCUMENTS

WO    20180122076 A1    7/2018

OTHER PUBLICATIONS

International Search and Written Opinion in Corresponding International Patent Application No. PCT/US19/57443 dated Jan. 14, 2020. 11 pages.

(Continued)

*Primary Examiner* — Khoi V Le
(74) *Attorney, Agent, or Firm* — Leason Ellis LLP

(57) ABSTRACT

A system, a method, and a computer program that extend a public Wi-Fi hotspot of an Internet service provider network to a private enterprise network system to transport non-enterprise traffic between the Internet service provider network and a non-enterprise computing device. The system, method, and computer program provide one or more tunnels between access points in the private enterprise network system and the Internet service provider network. The tunnels can be formed between one or more Internet service provider mobility controllers and, via a firewall, a DMZ (demilitarized zone) in the private enterprise network system to facilitate secure communication between the non-enterprise communicating devices and the Internet service provider network.

14 Claims, 8 Drawing Sheets

(56) References Cited

U.S. PATENT DOCUMENTS

2016/0044567 A1* 2/2016 Baghel ................ H04W 28/08
370/331
2017/0156086 A1* 6/2017 Tomici ................ H04W 36/14
2017/0230871 A1* 8/2017 Rangaswamy ... H04W 36/0033

OTHER PUBLICATIONS

Ruckus, SmartZone 100 and Virtual SmartZone Essentials: Administrator Guide for Release 3.5.1, Sep. 4, 2017.
Aruba, Aruba Central Access Points Configuration: User Guide, Oct. 2016.
Examination Report in Corresponding Gulf Coast Application No. 2019-38451 dated Jul. 25, 2020. 3 pages.

* cited by examiner

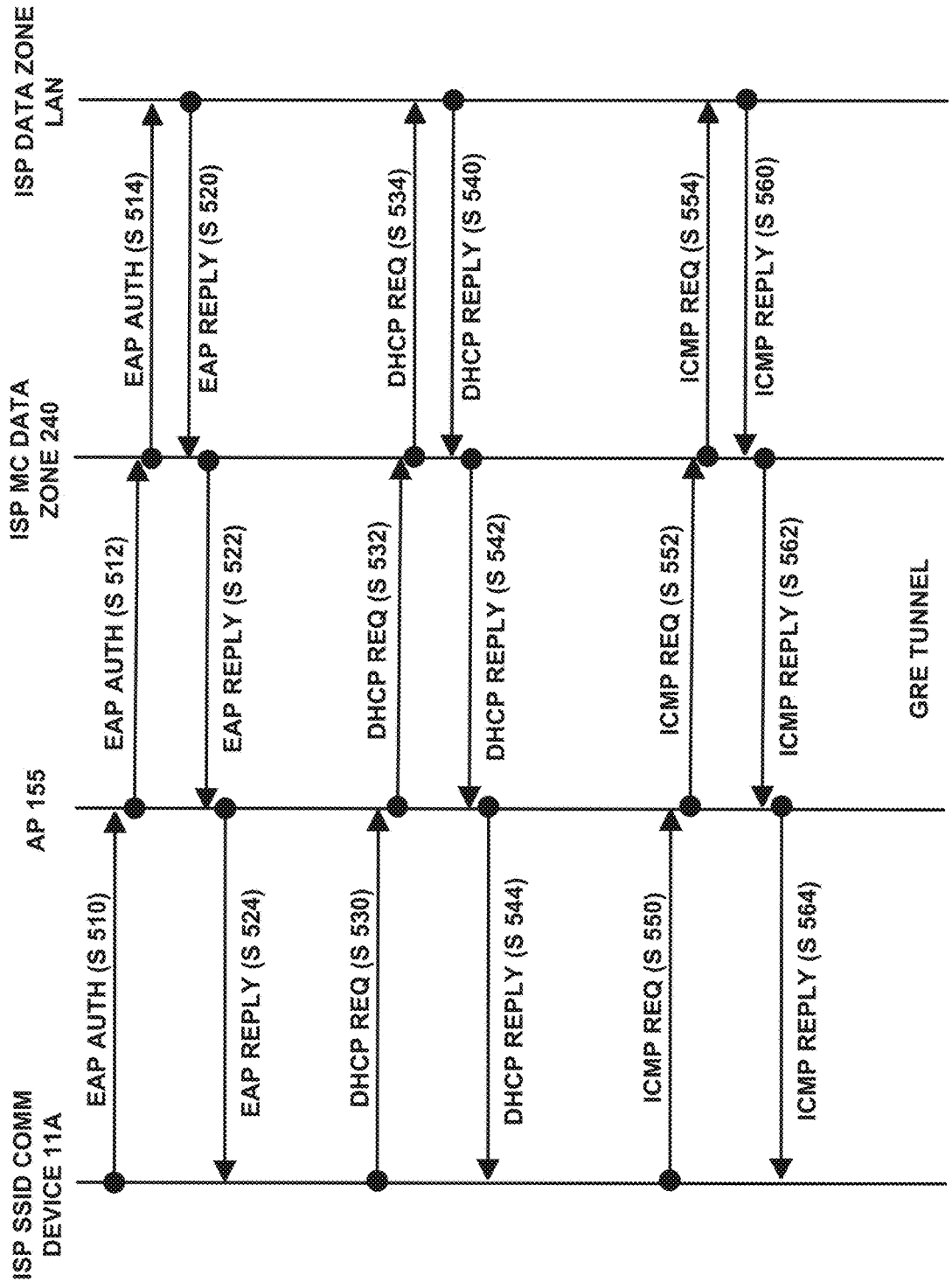

EXTENDING PUBLIC WIFI HOTSPOT TO PRIVATE ENTERPRISE NETWORK

FIELD OF THE DISCLOSURE

The present disclosure relates to a system, a method, and a computer program for securely extending and broadcasting any public Wi-Fi hotspot to a private enterprise network.

BACKGROUND OF THE DISCLOSURE

Computing devices typically communicate across wireless or hardwired communication links. A hotspot is a physical location where one or more computing devices can obtain access to the Internet, typically using wireless technology that connects to an Internet server provider network communication system (ISP). Hotspots frequently include wireless access points (WAPs) that facilitate Internet access via a wireless local area network (WLAN).

WAPs are frequently employed to facilitate wireless-to-hardwired communication links. WAPs can include, for example, one or more Wi-Fi devices that are connected to a hardwired network. The WAP can include one or more routers that connect to the hardwired network. The router(s) can be standalone devices, or devices that are integrated in the WAP. The WAP can function as a hotspot where one or more computing devices can access the Internet.

FIG. 1 shows an example of a state-of-the-art ISP 10. The ISP 10 typically uses the OSI model when communicating over a network 15. The ISP 10 includes a WAP 13 having a wireless connection 14 (such as, for example, an antenna) that can communicate, via a communication link 8, with a wireless connection 12 (such as, for example, an antenna) on a portable communicating device 11A. The communicating device 11A includes a computing device. The WAP 13 is communicatively coupled to an ISP server 16 via a communication link 8 and the network 15. The network communication system 10 can include a plurality of WAPs 13 that can be distributed widely in a geographical area and configured to facilitate communication with one or more communicating devices 11A. The WAP 13 facilitates communication between the communicating device 11A and the ISP 10 to provide Internet service to the communicating device 11A. The communicating device 11A can be configured to automatically logon to the ISP server 16 and access the Internet via the ISP 10.

FIG. 2 shows an example of a state-of-the-art private enterprise network communication system 20. The enterprise network communication system 20 includes a server suite (or server) 21 that can include a mail server 21A, web server 21B, file server 21C. The enterprise network communication system 20 includes ethernet switches 22A, 22B, a plurality of computing devices 23, and a router 24. The ethernet switches 22A, 22B can be connected to the server suite 21 and computing devices 23 via communication links 8. The router 24 can be connected to the ethernet switches 22A, 22B via communication links 8. The router 24 can be connected to, or integrally formed with a firewall 25 to connect to the network 15 via a communication link 8. In the enterprise network communication system 20, a computing device 23 can communicate with a communication device 11. The communicating device 11 can be configured to automatically logon to and access the enterprise network communication system 20. The enterprise network communication system 20 can securely transport data packets between the communicating device 11 and computing devices such as, for example, computing device 23, on the enterprise network communication system 20.

Typically, operators of ISP network communication systems strive to increase and expand access of their networks to communicating devices. On the other hand, operators of enterprise network communication systems strive to restrict non-enterprise communicating devices from accessing their networks. The inventors have realized that operators of ISP network communication systems and enterprise network communication systems, end users with communicating devices, and the public at large can greatly benefit from a technology that securely extends and broadcasts public Wi-Fi hotspots to non-public enterprise network communication systems.

SUMMARY OF THE DISCLOSURE

The disclosure provides a novel technology, including a method, a system, and a computer program, that securely extends access to ISP network communication systems via enterprise network communication systems. The disclosure provides a method and system that can securely extends and broadcasts a Wi-Fi hotspot to an enterprise network communication system. The method and system enable non-enterprise computing devices to access wireless network (Internet) service and/or ISP network communication systems via an enterprise network communication system, without impacting the security of the enterprise network communication system. The method and system are configured to reduce internal network bandwidth by transferring or offloading data transmission to the ISP network communication system.

Accordingly, the present disclosure provides a system, a method, and a computer program for extending a public Wi-Fi hotspot of an Internet service provider network to a non-enterprise communicating device. The enterprise network system comprises a local area network that includes a firewall, an access point zone that broadcasts a service set identifier of the enterprise network system (PEC SSID) and a service set identifier of the Internet service provider network (ISP SSID), and a mobility controller zone that tunnels data packets between the access point zone and the Internet service provider network to securely transport data packets between the Internet service provider network and the non-enterprise computing device, wherein the mobility controller zone tunnels data packets from the access point zone to provide secure transport of data packets to and from an enterprise computing device. The mobility controller zone can tunnel data packets to the Internet service provider network through the firewall.

The access point zone can comprise an access point that broadcasts the service set identifier of the enterprise network system (PEC SSID) and that communicates with the enterprise communicating device, transporting data packets to and from the enterprise communicating device.

The access point zone can comprise an access point that broadcasts the service set identifier of the Internet service provider network (ISP SSID) and that communicates with the non-enterprise communicating device, transporting data packets to and from the non-enterprise communicating device.

The access point zone can comprise a first access point that broadcasts the service set identifier of the enterprise network system (PEC SSID) and that communicates with the enterprise communicating device, transporting data packets to and from the enterprise communicating device; and a second access point that broadcasts the service set identifier of the Internet service provider network (ISP SSID) and that communicates with the non-enterprise communicating device, transporting data packets to and from the non-enterprise communicating device.

The mobility controller zone can comprise a mobility controller that is located in the Internet service provider network and integrated in the mobility controller zone. The mobility controller zone can comprise an other mobility controller. The other mobility controller can tunnel data packets to an other Internet service provider network. The other mobility controller can be located in the other Internet service provider network.

The access point zone can comprise a third access point that broadcasts a service set identifier of an other Internet service provider network (ISP2 SSID) and that communicates with an other non-enterprise communicating device, transporting data packets to and from the other non-enterprise communicating device, wherein the service set identifier of the Internet service provider network (ISP SSID) is different from the service set identifier of the other Internet service provider network (ISP2 SSID).

The mobility controller zone can tunnel data packets to provide secure transport of data packets between the enterprise computing device and the local area network.

The method for extending a public Wi-Fi hotspot of an Internet service provider network to an enterprise network system and securely transporting data packets between a non-enterprise communicating device and the Internet service provider via a demilitarized zone in the enterprise network system, comprises broadcasting a service set identifier of the enterprise network system (PEC SSID); broadcasting a service set identifier of the Internet service provider network (ISP SSID); tunneling data packets between an access point zone in the enterprise network system and a mobility controller in the Internet service provider network to securely transport data packets between the Internet service provider network and a non-enterprise computing device; and tunneling data packets between the access point zone and a mobility controller in the enterprise network system to securely transport data packets between a local area network in the enterprise network system and an enterprise computing device.

The tunneling the data packets between the access point zone in the enterprise network system and the mobility controller in the Internet service provider network can comprise tunneling the data packets to the Internet service provider network through a firewall in local area network in the enterprise network system.

The access point zone can comprise an access point that broadcasts the service set identifier of the enterprise network system (PEC SSID), and the method can further comprise transporting, by the access point and the other mobility controller, data packets between the local area network and the enterprise communicating device.

The access point zone can comprise an access point that broadcasts the service set identifier of the Internet service provider network (ISP SSID), and the method can further comprise transporting, by the access point, data packets between the non-enterprise computing device and the mobility controller in the Internet service provider network.

The access point zone can comprise a first access point that broadcasts the service set identifier of the enterprise network system (PEC SSID) and a second access point that broadcasts the service set identifier of the Internet service provider network (ISP SSID), and the method can further comprise transporting, by the first access point and the mobility controller in the enterprise network system, data packets between the local area network and the enterprise communicating device; and transporting, by the access point, data packets between the non-enterprise computing device and the mobility controller in the Internet service provider network.

The method can further comprise receiving an authentication request from the non-enterprise communicating device at the access point zone; and tunneling the authentication request from the access point zone to the mobility controller in the Internet service provider network.

The method can further comprise forwarding the authentication request from the mobility controller to an AAA server in the Internet service provider network; and receiving an authentication reply from the AAA server at the mobility controller in the Internet service provider network.

The method can further comprise tunneling the authentication reply from the mobility controller to the access point zone to be forwarded to the non-enterprise communicating device.

A non-transitory computer readable medium is provided that has a plurality of sections of computer program code that, when executed a computing device, extend a public Wi-Fi hotspot of an Internet service provider network to an enterprise network system and securely transport data packets between a non-enterprise communicating device and the Internet service provider via a demilitarized zone in the enterprise network system. The computer readable medium comprises a PEC SSID broadcasting code section that, when executed by the computing device, controls an access point to broadcast a service set identifier of the enterprise network system (PEC SSID); an ISP SSID broadcasting code section that, when executed by the computing device, controls an other access point to broadcast a service set identifier of the Internet service provider network (ISP SSID); an ISP tunneling code section that, when executed by the computing device, creates a secure channel and tunnels data packets between said other access point and a mobility controller in the Internet service provider network to securely transport data packets between the Internet service provider network and a non-enterprise computing device; and an PEC tunneling code section that, when executed by the computing device, creates a secure channel and tunnels data packets between the access point and a mobility controller in the enterprise network system to securely transport data packets between a local area network in the enterprise network system and an enterprise computing device.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

FIG. 8 shows an example of connectivity flow between a non-PEC communicating device and a local area network (LAN) in an ISP.

Figure 1:
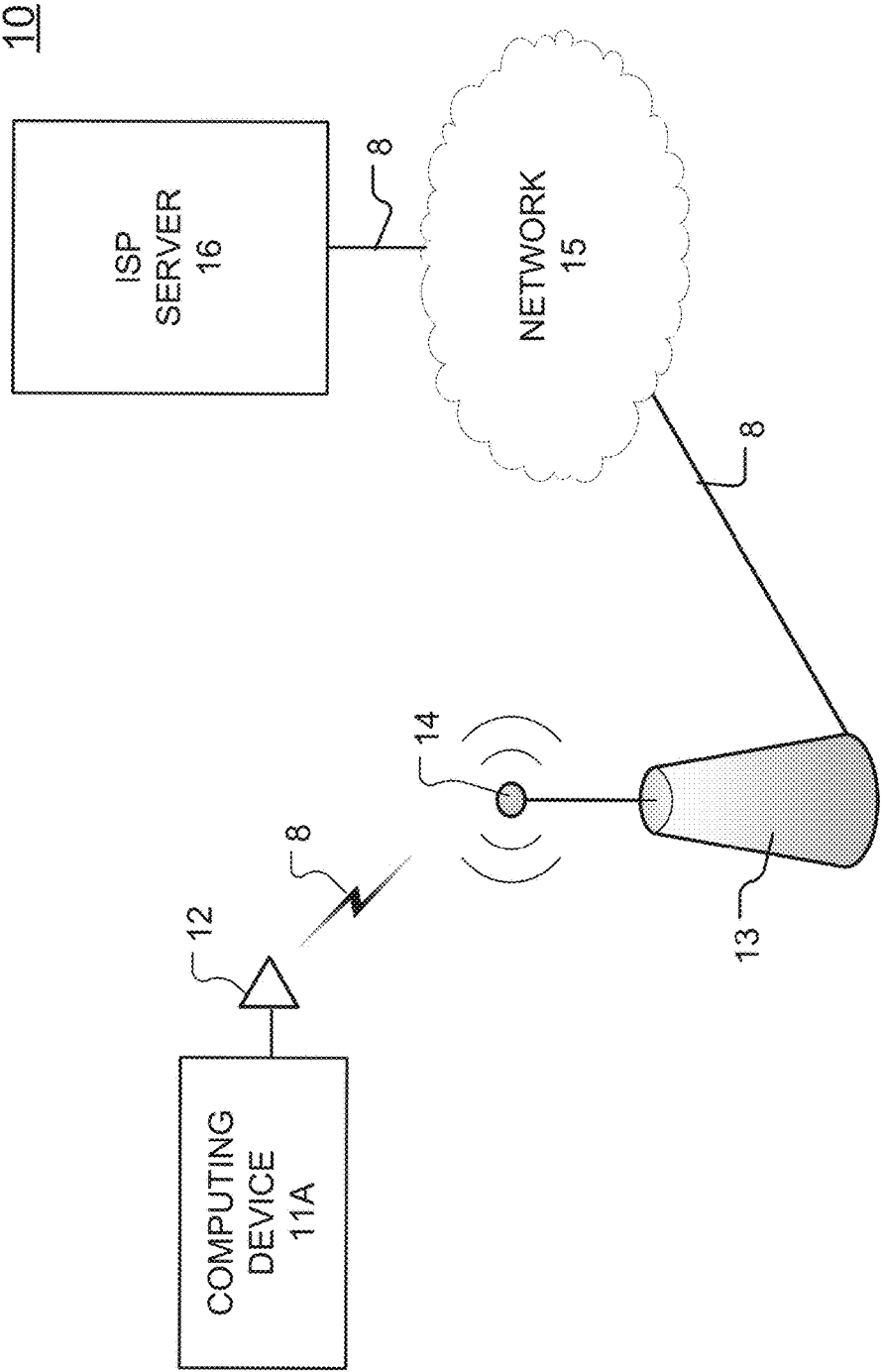
FIG. 1 depicts a state-of-the art ISP.

The present disclosure is further described in the detailed description that follows.

DETAILED DESCRIPTION OF CERTAIN EMBODIMENTS

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as those skilled in the art would recognize, even if not explicitly stated herein. Descriptions of well-known components and processing techniques may be omitted to not unnecessarily obscure the embodiments of the disclosure. The examples used herein are intended merely to facilitate an understanding of ways in which the disclosure may be practiced and to further enable those skilled in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 2:
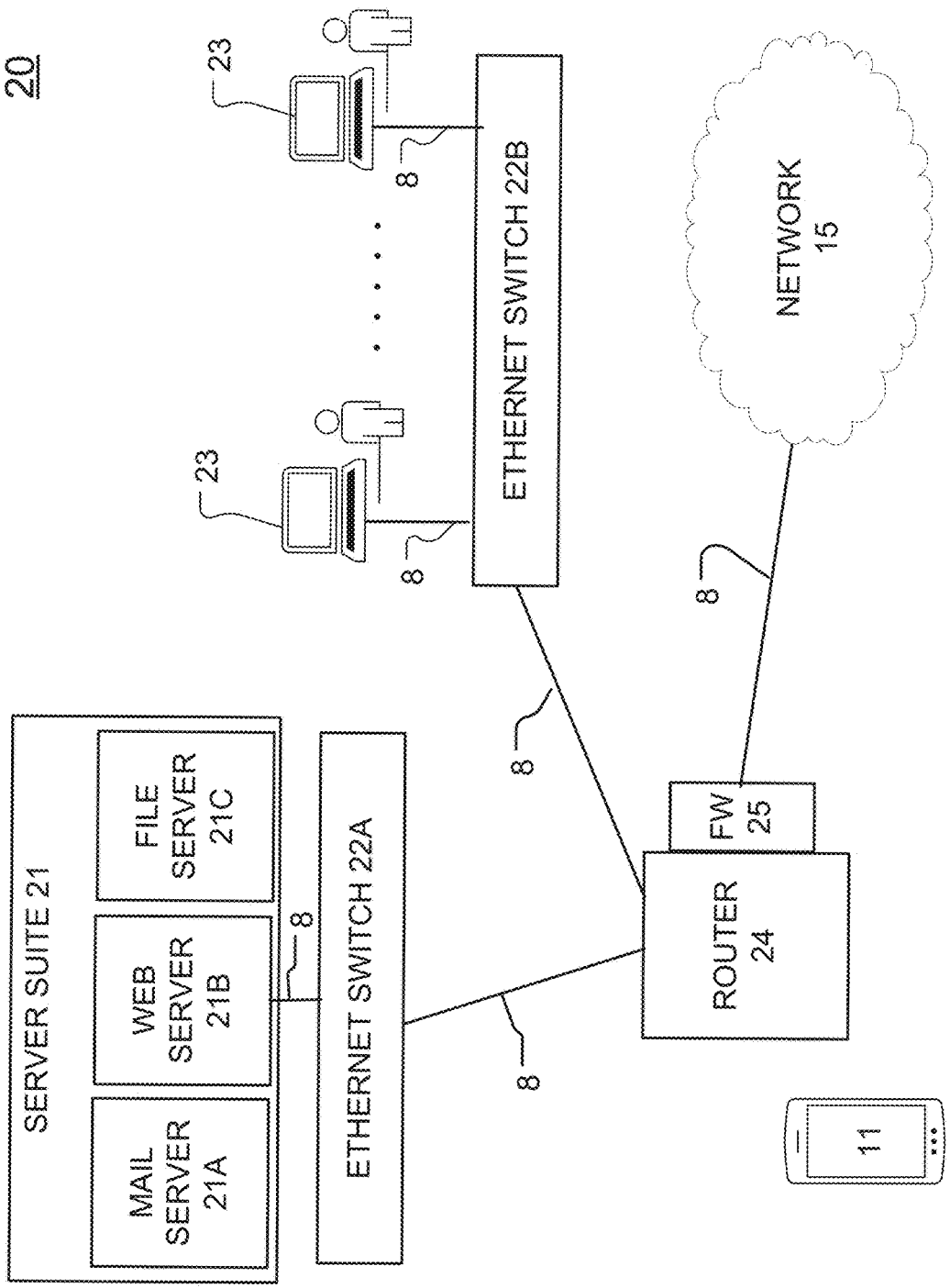
FIG. 2 depicts a state of the art enterprise network communication system.

Referring to FIGS. 1 and 2, existing network systems are increasingly strained by ever-increasing data-rate and bandwidth demands of mobile communication devices. Enterprise IP traffic is projected to have an aggregate annual growth rate of about 21% between 2016 and 2021 to 45,452 Petabytes of data per-month, which translates to about 4 Gigabytes of data per-month for the average business user, according to *Cisco Visual Networking Index: Forecast and Methodology*, 2016-2021. With even greater demands expected upon the implementation of the 5G standard, the inventors realized the desirability of offloading traffic from mobile communicating devices to public and private Wi-Fi networks in a secure manner that does not present any security risks to the non-public enterprise network communication systems. The inventors have realized that there is an unfulfilled need for a technology solution that facilitates increased and expanded access by communicating devices to ISPs by securely extending and broadcasting Wi-Fi hotspots to non-public enterprise network communication systems, without introducing any security risks to the non-public enterprise network communication systems.

The inventors have conceived and created a technology solution that provides a system, a method, and a computer program that securely extend a public Wi-Fi hotspot from an ISP to a non-public enterprise network communication (PEC) system through, inter alia, one or more mobility controllers and access points (APs). The PEC system can create and support one or more primary tunnels in the PEC system to handle traffic between PEC communicating devices and the PEC system, and one or more secondary tunnels in the PEC system to handle traffic between one or more ISPs and associated non-PEC communicating devices over PEC system infrastructure, without presenting any security risks to the PEC system. The secondary tunnels can be formed between one or more ISP mobility controllers and, via a firewall, a DMZ (demilitarized zone) in the PEC system to facilitate secure communication between the non-PEC communicating devices and the ISPs, for example, over the DMZ in the PEC system. The technology solution can enable and facilitate substantial expansion of public and/or ISP Wi-Fi access via non-public enterprise network communication systems, including, for example, private local area networks (LANs).

According to a non-limiting embodiment, one or more APs can be provided on the PEC system and configured to broadcast an ISP's service set identifier (SSID), connect a non-PEC communicating device via the AP to a (e.g., public) ISP network, and facilitate tunneled communication between the non-PEC communicating device and the ISP's network via the AP and the PEC system.

The PEC system can include the Open Systems Interconnection (OSI) model when communicating internally and over network systems. The PEC system, including computing devices that are connected to the PEC system, can operate at any one or more of the seven layers in the OSI model (shown in FIG. 3) at any instant in time. That is, referring to FIG. 3, which shows the seven-layer OSI model, the PEC system can operate at the application layer 1, presentation layer 2, session layer 3, transport layer 4, network layer 5, link layer 6, and/or physical layer 7.

Figure 3:
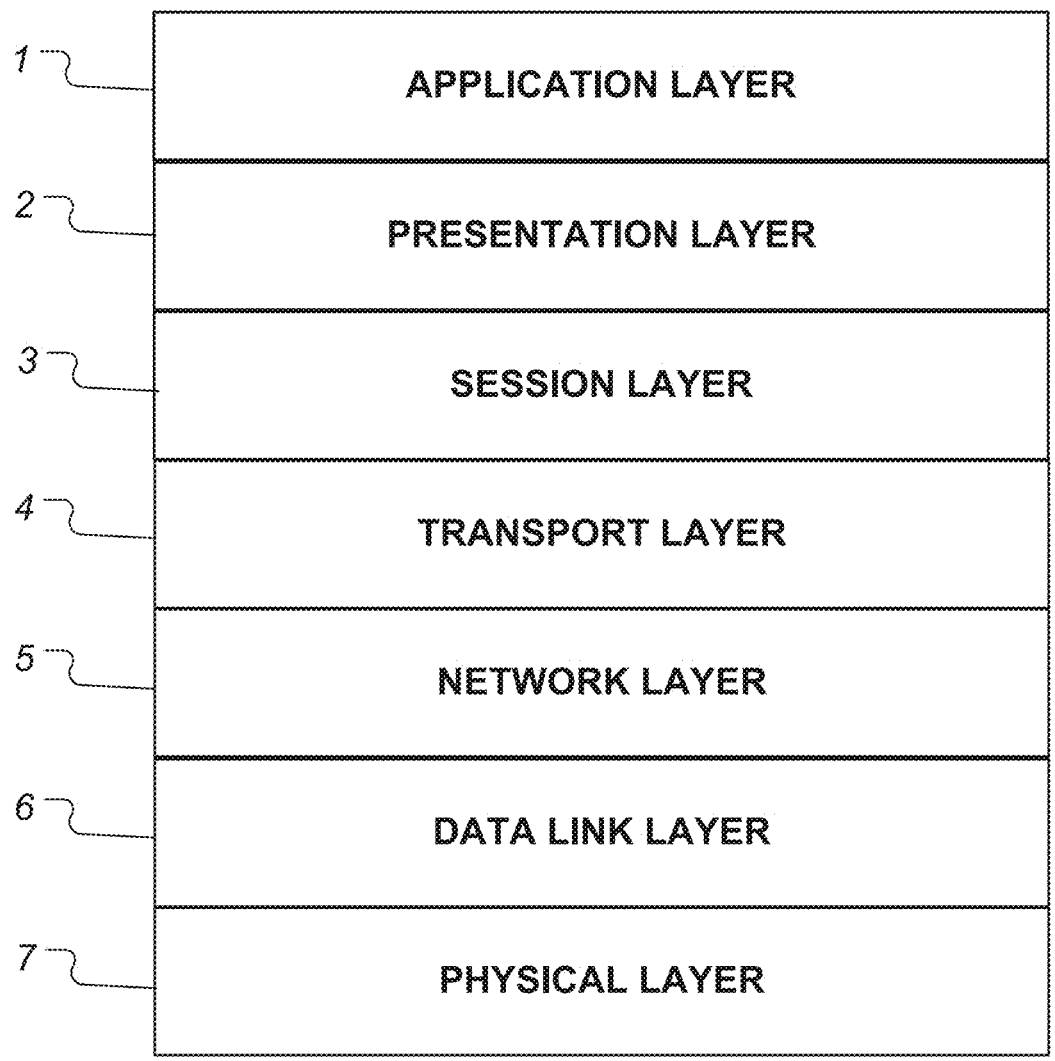
FIG. 3 depicts a representation of the Open Systems Interconnection (OSI) model for computer communication systems.

Referring to FIG. 3, the application layer 1 is the OSI layer in a computing device that is closest to the end user. The application layer 1 interacts with software applications in the computing device that implement a communicating component. The application layer 1 can include, for example, a search engine or any other software application which the end user can interact with to carry out a functionality.

The presentation layer 2 establishes context between software applications, which might use different syntax and semantics. The presentation layer 2 transforms data into a form that each software application can accept. An operating system is an example of the presentation layer 2.

The session layer 3 controls the connections between computing devices in a communication system. This layer is responsible for establishing, managing and terminating connections between local and remote applications. The layer can provide for full-duplex, half-duplex, or simplex operations, and is responsible for establishing checkpointing, adjournment, termination, and restart procedures.

The transport layer 4 provides the functional and procedural mechanisms for transferring variable-length data sequences from a source computing device to a destination computing device, while maintaining quality-of-service (QoS). The transport layer 4 controls the reliability of a given link through flow control, segmentation and desegmentation, and error control. The transport layer 4 can include, for example, tunneling protocols, the Transmission Control Protocol (TCP) and the User Datagram Protocol (UDP).

The network layer 5 provides the functional and procedural mechanisms for transferring data packets from a node on a network to another node on a different network. If the data to be transmitted is too large, the network layer 5 can facilitate splitting the data into a plurality of segments at the node and sending the fragments independently to the other node, where the segments can be reassembled to recreate the transmitted data. The network layer 5 can include one or more layer-management protocols such as, for example, routing protocols, multicast group management, network layer information and error, and network layer address assignment.

The link layer 6 is responsible for node-to-node transfer between computing devices in a communication system. In IEEE 802 implementations, the link layer 6 is divided into two sublayers, consisting of a medium access control (MAC) layer and a logical link control (LLC) layer. The MAC layer is responsible for controlling how devices in a network gain access to a medium and permission to transmit data. The LLC layer is responsible for identifying and encapsulating network layer protocols, and for controlling error checking and frame synchronization.

The physical layer 7 includes the hardware that connects the computing systems. The hardware can include for example connectors, cables, switches, and the like, that provide for transmission and reception of instruction and data streams between the computing devices.

When communicating in the PEC system or across one or more networks (for example, the Internet), a communicating device can be identified by an identifier such as, for example, an Internet Protocol (IP) address. The IP address typically includes a 32-bit number (e.g., IPv4) or a 128-bit number (IPv6). The IP address can serve two primary functions. First, the IP address can identify the communicating device or network interface. Second, the IP address can identify the location of the communicating device on the network.

IP addresses are generally assigned to communicating devices at the time of booting (known as a "dynamic IP address"), or permanently by fixed configuration of hardware and/or software in the communicating devices (known as a "static IP address"). Dynamic IP addresses are commonly assigned anew by a Dynamic Host Configuration Protocol (DHCP) server each time a computing device connects to a DHCP server network.

A static IP address, on the other hand, is permanently assigned to the communicating device (such as, for example, a network printer, a server, VPN server, etc.) and can be used to identify the communicating device on the network. Static IP addresses are typically used for commercial applications, compared to dynamic IP addresses, which are more commonly used for residential applications.

Figure 4:
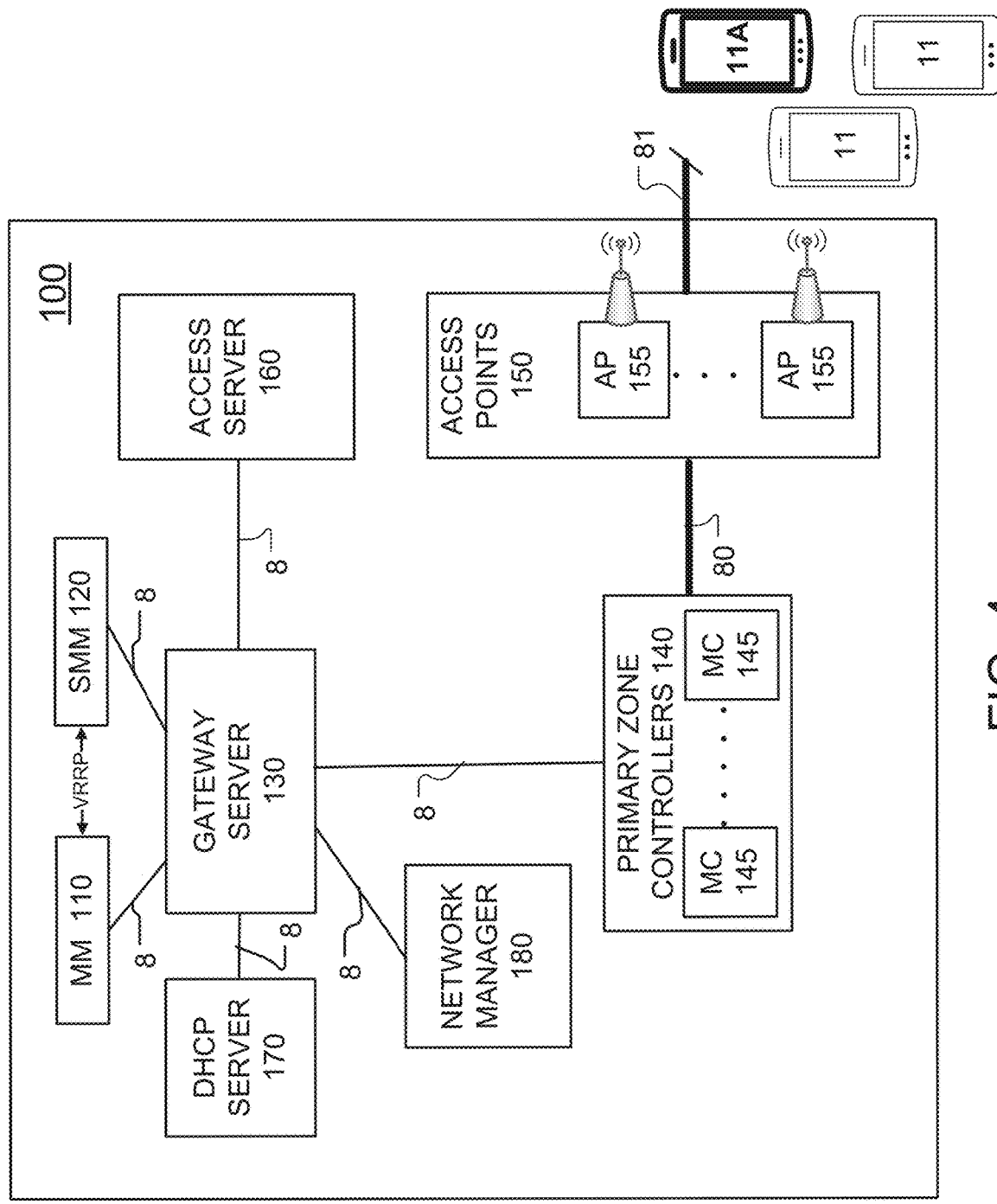
FIG. 4 shows an example of a private enterprise network communication (PEC) system that is constructed according to the principles of the disclosure.

FIG. 4 shows an example of a PEC system 100 that is constructed according to the principles of the disclosure. The PEC system 100 can include the non-public enterprise network communication system 20, shown in FIG. 2. The PEC system 100 includes a plurality of computing devices 110-180, each of which can be communicatively coupled to one or more communication links 8. The PEC system 100 includes a mobility master (MM) 110, a standby mobility master (SMM) 120, a gateway server 130, one or more mobility controllers (MC) 145, one or more APs 155, an access server 160, a DHCP server 170, and a network manager (NM) server 180. Each MC 145 can operate as a termination point in the PEC system 100. The one or more MCs 145 can be comprised as a mobility controller zone. The mobility controller zone can be configured to integrate one or more MCs 245 (shown in FIG. 5) from one or more ISPs 200. The mobility controller zone can comprise a primary MC zone 140 that includes a plurality of MCs 145. The primary MZ zone 140 can include a firewall and a DMZ. The one or more APs 155 can be comprised as an AP zone 150 that includes a plurality of APs 155. The AP zone 150 can broadcast one or more radio frequency (RF) signals that include an SSID that is unique to the PEC system 100 or its operator (PEC SSID). The AP zone 150 can broadcast one or more RF signals that include an SSID that is unique to an ISP 200 (shown in FIG. 5) (ISP SSID). The RF signal can include a plurality of ISP SSIDs, each of which can be unique to an individual ISP 200 (shown in FIG. 5). The ISP SSID is different from the PEC SSID.

The broadcasted RF signal(s) can be received by one or more communicating devices 11. The communicating devices 11 can be configured to recognize the PEC SSID and communicate with computing devices in the PEC system 100, which can be located behind a firewall. The communicating device 11A can be configured to recognize the PEC SSID and logon to and communicate with the PEC system 100. The non-PEC communicating device 11A can be configured to recognize the ISP SSID and communicate with the ISP 200. For instance, the non-PEC communicating device 11A can be configured to automatically (or manually) connect to and access resources on the ISP 200. The communicating devices 11 and non-PEC communicating devices 11A can operate at any level in the OSI model. The communicating devices 11 and non-PEC communicating devices 11A can be the same, or different in terms of hardware, firmware, or software.

The MM 110 can include one or more master routers (not shown) and the SMM 120 can include a redundant backup for the MM 110. The MM 110 can function as a services gateway. The MM 110 can function as a configuration point in the PEC system 100. The MM 110 and SMM 120 can include one or more routers running the Virtual Router Redundancy Protocol (VRRP) or Hot Standby Router Protocol (HSRP). The MM 110 can act as a default router for communicating devices 11 and computing devices on a shared LAN in the PEC system 100. The MM 110 can include one or more virtual router identifiers (VRIs) and one or more sets of associated IP addresses across a common LAN. The MM 110 can have the responsibility of forwarding data packets sent to the IP addresses associated with a virtual router and answering Address Resolution Protocol (ARP) requests for these addresses. The MM 110 can provide automatic assignment of available IP routers to participating communicating devices 11 over active communication links, thereby increasing availability and reliability of routing paths. If a physical router that is routing packets on behalf of a virtual router fails for any reason, the MM 110 can automatically select another router to replace it. By sharing an IP address and a MAC (OSI layer 6, shown in FIG. 3) address, two or more routers can act as a single virtual router.

The SMM 120 can provide automatic assignment of available IP routers to participating communicating devices 11 over passive communication links, as needed. The SMM 120 can assume forwarding responsibility for a virtual router should the MM 110 fail. The VRRP protocol design can provide rapid transition from SMM 120 to MM 110 to minimize service interruption and incorporate optimizations that reduce protocol complexity while ensuring controlled master transition for typical operational situations. The MM 110 and SMM 120 can continuously exchange status messages, so that if the MM 110 fails, the SMM 120 can assume the routing responsibility of the MM 110.

The MM 110 can perform protocol messaging using IP multicast datagram and can operate over a variety of multiaccess LAN technologies that might support IP multicasting. Each virtual router can include a unique MAC address (e.g., OSI layer 6, shown in FIG. 3). Each virtual router can be identified by a Virtual Router Identifier (VRID) and set of IP addresses. The MM 110 can associate a virtual router with its real address on an interface. The MM 110 can include virtual router mappings and priority for virtual routers that are to be backed up. Mapping between VRIDs and addresses can be coordinated amongst all VRRP routers on a LAN.

The MM 110 and SMM 120 can be connected to the gateway server 130. The gateway server 130 can communicate with and manage communication between the MM 110, SMM 120, the primary MC zone 140, access server 160, DHCP server 170, and NM server 180. The gateway server 130 can control data flow between these computing devices over respective communication links 8. The gateway server 130 can operate at any of the seven layers of the OSI model (shown in FIG. 3). The gateway server 130 can include a firewall.

The gateway server 130 can include an authentication, authorization, and accounting (AAA) server. The AAA server can include AAA protocols with Extended Application Protocol (EAP) support such as, for example, Remote Authentication Dial-in User Service (RADIUS) and Diameter (DIAM-EAP). The AAA server can provide centralized authentication, authorization, and accounting management for communicating devices that connect and use the PEC system 100. The AAA server can run in the application layer 1 of the OSI Model (shown in FIG. 3), and can use, for example, TCP, UDP, or the like, as transport protocols.

The primary MC zone 140 can operate as a centralized services gateway that can scale to handle large numbers of authentications and roaming events, including authentication of the APs 155 in the AP zone 150. The MCs 145 can validate an AP request with the AAA server in the PEC system 100, respond with authorization information, and establish an Internet Security Protocol (IPsec) tunnel or virtual private network (VPN). Each MC 145 can act as a services gateway or a VPN termination point. The primary MC zone 140 can also perform stateful firewall policy monitoring and enforcement. The MC 145 can include, but is not in any way limited to, for example, an ARUBA™ 7200 series mobility controller.

The primary MC zone 140 can support a plurality of tunnels to the MCs 145, which can act as services gateways. The primary MC zone 140 can include a physical or a logical subnetwork that contains the PEC system's external-facing services to the Internet and/or the AP zone 150. The primary MC zone 140 can include one or more primary tunnels to support communication between PEC communicating devices 11 and the PEC system 100. The primary MC zone 140 can include one or more secondary tunnels to support communication between non-PEC communicating devices 11A and one or more ISPs 200 (shown in FIG. 5). The secondary tunnels can connect through a firewall to one or more MCs 245 at ISPs 200 in a secured and controlled manner to satisfy security and policy requirements of the PEC system 100.

The primary MZ zone 140, which can include a firewall and a DMZ, can communicate via one or more tunnels over communication links 80 with the AP zone 150. The tunnels can include one or more primary tunnels and/or one or more secondary tunnels. The tunnel(s) can include a Generic Routing Encapsulation (GRE) operator SSID tunnel or an adoption tunnel. The primary MC zone 140 can include one or more IPsec connections across the communication links 80 between the MCs 145 and AP zone 150 to setup up one or more tunnels. The primary MC zone 140 can tunnel select traffic between the MCs 145 and APs 155 in the AP zone 150 over one or more communication links 80. For instance, an MC 145 can include an IPsec connection with an AP 155 and create a GRE tunnel and/or an adoption tunnel between the devices to securely carry data packets between the non-PEC communicating device 11A and the ISP 200 (shown in FIG. 5) that is associated with the broadcasted ISP SSID. The MC 145 and AP 155 can facilitate transmission of data packets over communication links 80, carrying data packets between the non-PEC communicating device 11A and the ISP 200 without any processing (e.g., parsing) of any of the data packets. The data packets can be encrypted with an encryption scheme that is indecipherable by the PEC system 100.

The mobility controller zone, including the primary MC zone 140, can integrate an MC 245 from the ISP 200 (shown in FIG. 5) to extend the ISP SSID for the particular ISP 200 to the PEC system 100. Network traffic can be routed to the ISP 200 via the PEC system 100 infrastructure. The PEC system 100 can be a medium to extend Wi-Fi hotspots of the ISP 200 to APs 155 of the PEC system 100 to reach new areas. The PEC system 100 can lower its Internet bandwidth requirements by offloading Internet traffic to the ISP 200 and the ISP 200 can reach new non-PEC communicating devices 11A at new locations through the APs 155 on the PEC system 100 that broadcast the ISP SSID associated with the ISP 200.

The AP zone 150 can include one or more ISP connectivity links that facilitate transfer of data packets between the AP zone 150 and one or more ISPs 200 (shown in FIG. 5) over communication links 81. The ISP connectivity links can include, for example, UDP port 4500, IP protocol 47 (GRE), or the like. The communication links 81 can support one or more GRE ISP data tunnels that are formed between the AP zone 150 and ISPs 200 (shown in FIG. 5).

An AP 155 can be communicatively coupled to an MC 145 over the communication link 80. The APs 155 can be communicatively coupled to one or more ISPs 200 over the ISP connectivity links and the communication links 81. The AP 155 can include a networking hardware, firmware, or software device that can communicate with one or more of the PEC communicating devices 11 or non-PEC communicating devices 11A over one or more communication links. The AP 155 can be configured or controlled to broadcast the PEC SSID or the ISP SSID. The AP 155 can broadcast more than one ISP SSID, with each ISP SSID being unique to a particular ISP 200 (shown in FIG. 5). The broadcasted PEC SSID can be hidden from detection by non-PEC communicating devices 11A. The AP 155 can allow the communicating devices 11 to connect to the PEC system 100 or allow the non-PEC communicating device 11A to connect to the ISP 200 (shown in FIG. 5) over ISP connectivity links and communication links 81.

The access server 160 can enable, control, and manage network access, secure device onboarding and guest device access. The access server 160 can implement policies and control access to networks, including LANs and VPNs. The access server 160 can include an access management solution such as, for example, the ARUBA™ ClearPass Access Management Solution. The access server 160 can be connected to the gateway server 130. The access server 160 can include one or more databases that store policy data. The access server 160 can include a firewall. The access server 160 can include a AAA server (not shown) that can provide centralized authentication, authorization, and accounting management for PEC communicating devices 11 that connect and use the PEC system 100.

The DHCP server 170 can include a network server that implements a Dynamic Host Configuration Protocol (DHCP) to automatically generate and dynamically assign IP addresses, default gateways, and other network parameters to the computing devices in the PEC system 100, such as computing devices that need to communicate with other IP networks. The DHCP server 170 can receive and process IP address requests. The DHCP server 170 can manage UDP and IP settings for computing devices on the PEC system 100.

The DHCP server 170 can include a Domain Name System (DNS) for the computing devices, services, and other resources connected to the PEC system 100. The DHCP server 170 can translate more readily discernable domain names to numerical IP addresses necessary for locating and identifying services and computing devices with the underlying network protocols.

The NM server 180 can include a network management platform that can carry out real-time monitoring and visibility, deep packet inspection of local traffic and software applications in the PEC system 100 to allow both application and application category policies, connectivity analytics, wireless intrusion event detection and protection, and location and mapping of Wi-Fi coverage by the PEC system 100 and the underlying wired topology to provide an accurate and clear picture of what computing devices are on the PEC system 100 at any time. The network management platform can include, but is not in any way limited to, for example, the ARUBA AIRWAVE Network Management Solution provided by Aruba Networks company.

Figure 5:
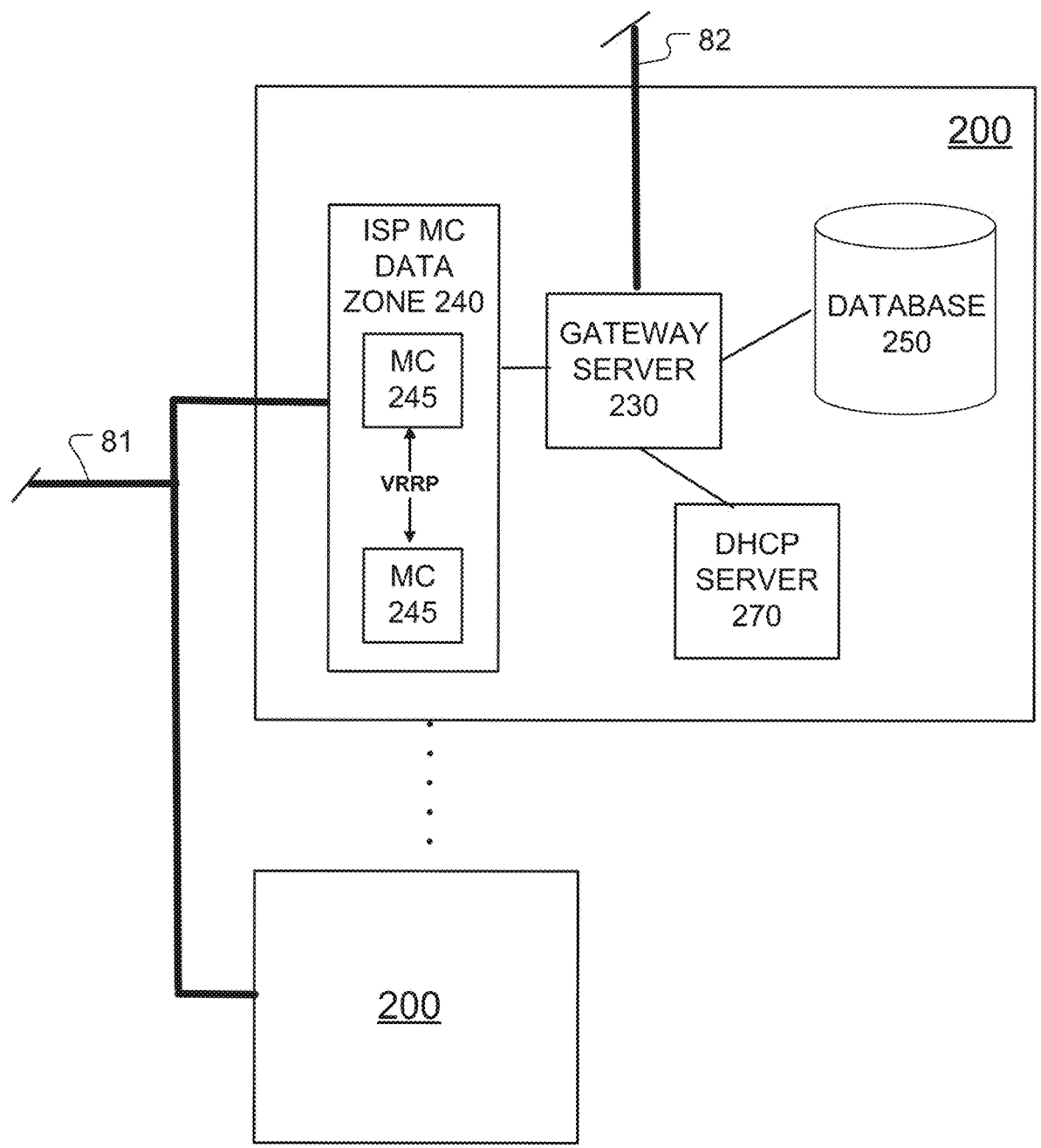
FIG. 5 shows an example of an ISP that can be communicatively connected to the PEC system along with one or more additional ISPs.

FIG. 5 shows an example of an ISP 200 that can be communicatively connected to the PEC system 100 along with one or more additional ISPs 200 over communication links 81. The ISP 200 can include a gateway server 230, an ISP MC data zone 240, a database 250, and a DHCP server 270. The gateway server 230 can communicate with and manage communication between the MC data zone 240, database 250, DHCP server 270 and computing devices (not shown) on the ISP 200 or external to the ISP 200 over communication links 82. The gateway server 230 controls data flow between these computing devices over respective communication links. The gateway server 230 can operate at any of the seven layers of the OSI model (shown in FIG. 3). The gateway server 230 can include a firewall. The gateway server 230 can include an AAA server (not shown) that can provide centralized authentication, authorization, and accounting management (AAA) for computing devices that connect and use the ISP 200, including non-PEC communicating devices 11A.

The MC data zone 240 can include one or more MCs 245. The MC data zone 240 can include an ISP firewall. The MC data zone 240 can support a plurality of networks (e.g., VPNs) and tunnels to the MCs 245, each of which can act as a services gateway. Each MC 245 can support and communicate via a tunnel over a communication link 81 with the primary MC zone 140 in the PEC system 100. The communication can include a GRE operator SSID tunnel. The MC data zone 240 can include one or more IPsec connections. The MCs 245 can tunnel select traffic between the ISP 200 and the primary MC zone 140 in the PEC system 100 over one or more communication links 81. For instance, an MC 245 can support a GRE tunnel between the primary MC zone 140 and the ISP 200 to securely carry data packets between the non-PEC communicating device 11A and the MC 245 in the ISP 200. The MC 245 can facilitate transmission of data packets over communication links 81, carrying data packets between the PEC system 100 and ISP 200, including data packets originating from or destined to the non-PEC communicating device 11A. The data packets can be encrypted with an encryption scheme that is decipherable by the ISP 200, but indecipherable by the PEC system 100. The MC data zone 240 and primary MC zone 140 can be running on the same operating system (OS) version.

The MCs 245 can include one or more routers running VRRP. An MC 245 can act as a default router for hosts on a shared LAN on the ISP 200. An MC 245 can act as backup for another MC 245. The MC 245 can include one or more VRIs and one or more sets of associated IP addresses across a common LAN. The MC 245 can have the responsibility of forwarding packets sent to the IP addresses associated with a virtual router and answering ARP requests for these addresses.

The DHCP server 270 can include a network server that automatically generates and dynamically assigns IP addresses, default gateways, and other network parameters to the computing devices in the ISP 200, including non-PEC communicating devices 11A. The DHCP server 270 can receive and process IP address requests. The DHCP server 270 can manage UDP/IP settings for computing devices on the ISP 200.

The DHCP server 270 can include a DNS for the computing devices, services, and other resources connected to the ISP 200. The DHCP server 270 can translate more readily discernable domain names to numerical IP addresses necessary for locating and identifying services and computing devices with the underlying network protocols.

Figure 6:
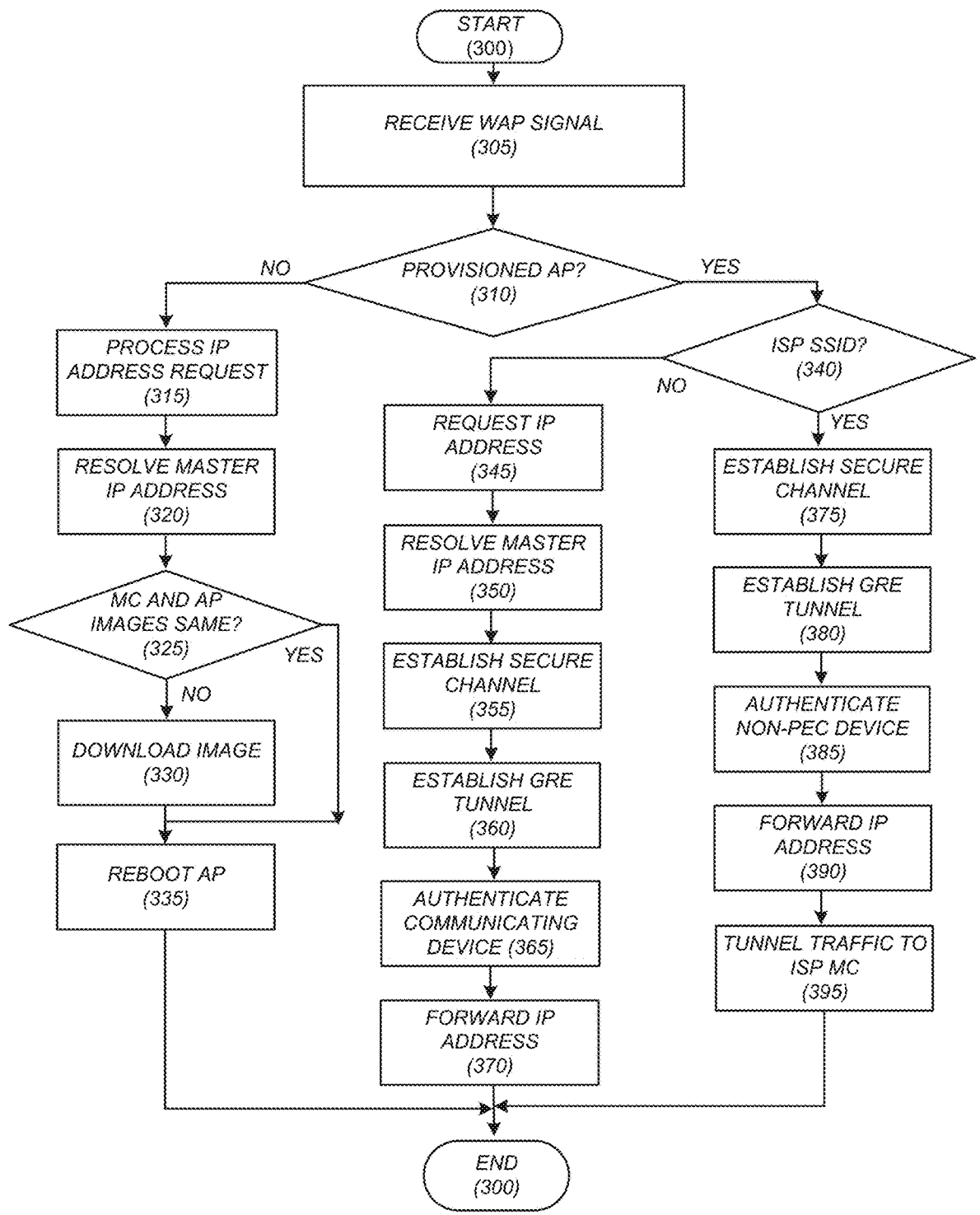
FIG. 6 shows an example of a communication process for connecting a non-PEC communicating device to an ISP over the PEC system.

FIG. 6 shows an example of a communication process 300 for connecting a non-PEC communicating device 11A (shown in FIG. 4) to the ISP 200 (shown in FIG. 5) over the PEC system 100 (shown in FIG. 4).

Referring to FIGS. 4 to 6, a wireless access point (WAP) signal can be received from a given AP 155 (Step 305). A determination can be made (e.g., based on the WAP signal from the given AP 155) whether the AP 155 is a provisioned AP (Step 310). If it is determined that the AP 155 is not a provisioned AP (NO at Step 310), then a determination can be made whether that the AP 155 is a new AP and an IP address request received from that AP 155 can be communicated to the DHCP server 170 in the PEC system 100 (Step 315). The DHCP server 170 can resolve the master IP address using DNS and assign an IP address to that AP 155 (Step 320). A check can be made whether the AP 155 is running the same image as an associated MC 145 (Step 325). If a determination is made that the AP 155 is not running an image, or is running a different image than the associated MC 145 (NO at Step 325), then an image corresponding to the associated MC 145 can be downloaded to the AP 155 using, for example, File Transfer Protocol (FTP, via TCP port 21), Trivial FTP (TFTP, via UDP port 69), or the like (Step 330) and the AP 155 can be rebooted (Step 335). Communication between the AP 155 and the MM 110 or MC 145 can be facilitated by the DHCP (and DNS) server 170, PAPI Protocol (via UDP port 8211), and Control Plane Security (CPsec) (via UDP port 4500). If a determination is made that the AP 155 is running the same image as the associated MC 145 (YES at Step 325), then the AP can be rebooted (Step 335).

If it is determined that the AP 155 is a provisioned AP (YES at Step 310), then a determination can be made whether that AP 155 is provisioned to broadcast an ISP SSID (Step 340). The PEC system 100 can include two or more APs 155, or two or more zones of APs 155, with each AP 155 (or zone of APs 155) being dedicated to broadcasting a unique ISP SSID, with each unique ISP SSID belonging to a particular ISP 200.

If it is determined that the AP 155 is provisioned to broadcast the PEC SSID (not an ISP SSID) (NO at Step 340), then an IP address request received from that AP 155 can be communicated to the DHCP server 170 in the PEC system 100 (Step 345). Communication between the AP 155 and the MC 145 can be facilitated by the DHCP (and DNS) server 170, CPsec (via UDP port 4500), SYSLOG (via UDP port 123), PAPI Message Heartbeats (via UDP port 8211) (8209), and GRE (protocol 47). The DHCP server 170 can resolve the master IP address using DNS and assign an IP address to that AP 155 (Step 350). A secure channel can be established to the AP 155 (Step 355), such as, for example, a secure PAPI protocol channel using UDP 4500 (CPsec tunnel). After the secure channel is established (Step 355), a GRE tunnel can be established with the MC 145 and the PEC SSID can be broadcasted by the AP 155 (Step 360), which can then be accessed by a PEC communicating device 11 to securely communicate with computing devices on the PEC system 100. The communicating device 11 can be authenticated by, for example, the AAA server (not shown) included in the gateway server 130 or access server 160 (Step 365), and an IP address assigned and forwarded to the communicating device 11 (Step 370), and data packets can be securely communicated between the communicating device 11 and the computing devices on the PEC system 100.

If it is determined that the AP 155 is a provisioned AP (YES at Step 310) and the AP 155 is provisioned to broadcast an ISP SSID (YES at Step 340), then a secure channel can be established between the AP 155 and an associated MC 245 at the ISP 200 (Step 375). Data transmission between the AP 155 and the MC 245 can be facilitated through the firewall in the PEC system 100 via, for example, Control Plane Security (CPsec) using UDP port 4500, GRE (using protocol 47). All multizone APs 155 that broadcast an ISP SSID for a particular ISP 200 can reach the MC(s) 245 in that ISP 200. After the secure channel is established (Step 375), a GRE tunnel can be established with the MC 245 at the ISP 200 and the ISP SSID for that ISP 200 can be broadcasted by the AP 155 (Step 380), which can then be accessed by one or more non-PEC communicating devices 11A. If a plurality of APs 155 are provisioned to broadcast the ISP SSID in multiple locations or zones, secure channels can be established between the APs 155 and the MC(s) 245 at the ISP 200. The non-PEC communicating device(s) 11A can be authenticated by, for example, the AAA server (not shown) included in the gateway server 230 (Step 385), and an IP address assigned by the ISP AAA server and forwarded to the non-PEC communicating device 11A (Step 390) and data packets can be securely communicated through the GRE tunnel between the non-PEC communicating device(s) 11A and the MC 245 in the ISP 200 (Step 395).

The process 300 can integrate an MC 245 of an ISP 200 to the MC 145 in the PEC system 100, thereby extending an ISP SSID for the particular ISP 200 to the PEC system 100 and securely tunneling data transmission and managing traffic flow between non-PEC communicating devices 11A and the ISP 200 over PEC system 100 infrastructure. Thus, the PEC system 110 can extend the service provider public hotspots of the ISP 200 to reach new areas.

Each of the communicating devices 11, 11A can include a network interface (not shown). The communicating devices 11, 11A can use a transport layer protocol, such as TCP or UDP, together with a network layer protocol such as IP to transport and manage communication of data packets from and to the communicating devices. The transport layer can specify a source and a destination port number in the headers of data packets. The port number can include a two-byte (or 16-bit) unsigned integer, ranging from, for example, 0 to 65535. For instance, port numbers 80 and 443 are generally associated with the Internet, with port number 80 being associated with the World Wide Web ("WWW") and port number 443 being associated with the WWW using Secure Socket Layer ("SSL"), respectively.

The network layer (OSI layer 5, shown in FIG. 3) can include a four (4) byte IP address (IPv4) or a six (6) byte IP address (IPv6) that is assigned to each network interface card (not shown) on each communicating device 11, 11A. This can be done, for example, automatically by the DHCP server 170 in the PEC system 100 that services the communicating device 11, or the DHCP server 270 in the ISP 200 that services the communicating device 11A. The IP addresses can then be used to locate and connect to the communicating devices 11 to the PEC system 100 and the communicating devices 11A to the ISP 200.

During communication on the PEC system 100 or ISP 200, the communicating devices 11, 11A can implement a binding process that associates the communicating device's input/output channels by means of an Internet socket, which can include a type of file descriptor, with a transport protocol, a port number, and an IP address. The binding process can enable sending and receiving data packets by the communicating device 11, 11a over the PEC system 100 or the ISP 200. The operating system networking software in the communicating devices 11, 11A can be tasked with transmitting outgoing data from all application ports onto the PEC system 100 or the ISP 200 and forwarding arriving network data packets to processes by matching the IP addresses and port numbers parsed from headers of incoming data packets. A single process in the communicating device 11, 11A can bind to a specific IP address and port combination using the same transport protocol.

The IP address assigned to each communicating device 11, 11A can serve as a unique identifier for a network interface (not shown) at the network layer. When the network interface is connected to the PEC system 100 or ISP 200, the IP address can be used to locate and establish a communication session with the associated communicating device 11, 11A. The IP address can include a network prefix number, a host number, and a subnet number. The network prefix number can be provided to the communicating devices 11 by the PEC system 100 and the communicating devices 11A by the associated ISP 200 that provides service to the communicating device 11A.

A non-transitory computer readable medium can be provided containing a computer program, which when executed on one or more of the computing devices in the PEC system 100 or ISP 200, causes the process 300 in FIG. 6 to be carried out. The computer program can be tangibly embodied in the computer readable medium, comprising one or more program instructions, code segments, or code sections for performing each of the Steps 305 through 395 when executed by one or more computing devices in the PEC system 100 or ISP 200. The process 300, when carried out by the PEC system 100 or ISP 200, can securely extend a public Wi-Fi hotspot of the ISP 200 to one or more APs 155 on the PEC system 100 through the ISP MC data zone 240 (e.g., by an MC 245 being integrated into to the primary MC zone 140). The APs 155 can provide primary (or enterprise-specific) GRE tunnels in the PEC system 100, as well as secondary GRE tunnels connecting to the ISP 200 through a firewall in the DMZ in the primary MC zone 140 in a secured and controlled manner to satisfy the requirements and policies of the PEC system 100 and ISP 200.

Figure 7:
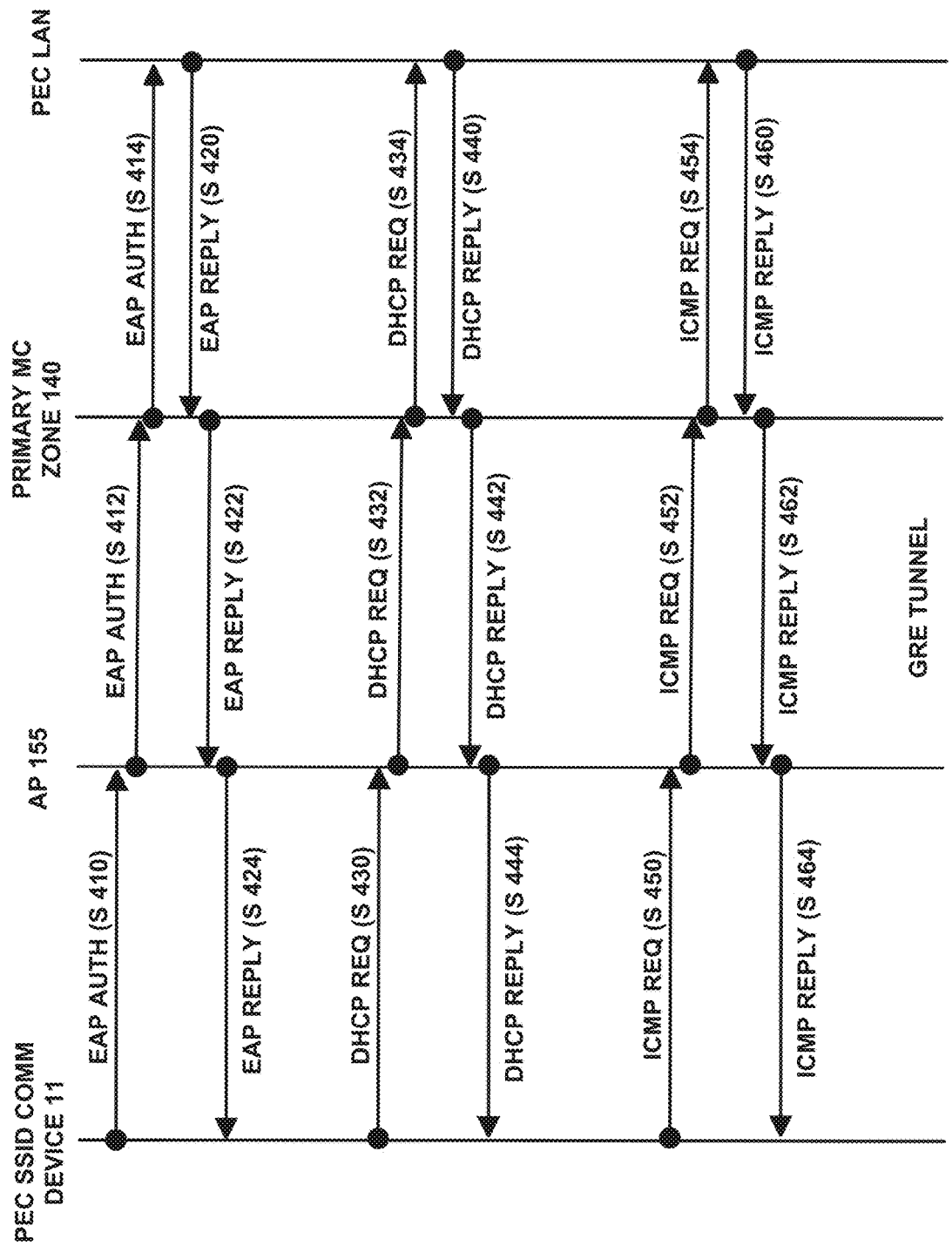
FIG. 7 shows an example of connectivity flow between a communicating device and a local area network (LAN) in the PEC system.

FIG. 7 shows an example of connectivity flow between a communicating device 11 and a local area network (LAN) in the PEC system 100 (PEC LAN). Referring to FIGS. 4 and 7, an AP 155 can broadcast a PEC SSID for the PEC system 100 that can be detected by a communicating device 11. The communicating device 11, which has been configured to operate on the PEC system 100, can transmit an EAP authentication request EAP AUTH to the AP 155 (Step 410). The AP 155 can tunnel the EAP AUTH to the primary MC zone 140 (Step 412), which in turn can forward the EAP AUTH to, for example, a LAN in the PEC system 100 (Step 414). The EAP AUTH can be run directly over data link layers such as, for example, Point-to-Point Protocol (PPP) or IEEE 802, without requiring IP. The EAP AUTH can be received by the AAA server in the PEC system 100, which can then authenticate the communicating device 11 and respond with an authentication reply EAP REPLY (Step 420). The EAP REPLY can be received by the primary MC zone 140 and tunneled to the AP 155 (Step 422) and forwarded to the communicating device 11 (Step 424).

The communicating device 11 can send an IP address request to the AP 155, requesting assignment of an IP address and networking parameters DHCP REQ (Step 430). The AP 155 can tunnel the DHCP REQ to the primary MC zone 140 (Step 432), which in turn can forward the DHCP REQ to the DHCP server 170 in the PEC system 100 (Step 434). The DHCP server 170 can assign an IP address and a response DHCP REPLY can be sent to the primary MC zone 140, including an IP address and networking parameters (Step 440). The DHCP REPLY can be tunneled from the primary MC zone 140 to the AP 155 (Step 442) and forwarded to the communicating device 11 (Step 444).

After being authenticated and receiving an IP address and networking parameters, the communicating device 11 can send an Internet Control Message Protocol (ICMP) request ICMP REQ to the AP 155 (Step 450). The ICMP REQ can include, for example, operational information, an error message, or a ping such an ICMP ECHO_REQUEST data packet. The AP 155 can tunnel the ICMP REQ to the primary MC zone 140 (Step 452), which in turn can forward the ICMP REQ to the access server 160 or network manager 180 in the PEC system 100 (Step 454). The access server 160 or network manager 180 can respond with an ICMP REPLY to the primary MC zone 140 (Step 460). The ICMP REPLY can include, for example, operational information, an error message, or an ICMP ECHO_REPLY packet in response to the ICMP ECHO_REQUEST data packet. The ICMP REPLY can be tunneled from the primary MC zone 140 to the AP 155 (Step 462) and forwarded to the communicating device 11 (Step 464).

FIG. 8 shows an example of connectivity flow between a non-PEC communicating device 11A and a LAN in the ISP 200 (ISP DATA ZONE LAN). Referring to FIGS. 4, 5, and 7, an AP 155 can broadcast an ISP SSID for the ISP 200 that can be detected by a non-PEC communicating device 11A. The non-PEC communicating device 11A, which can be configured to operate with the ISP 200, can transmit an EAP authentication request EAP AUTH to the AP 155 (Step 510). The AP 155 can tunnel the EAP AUTH to the MC data zone 240 in the ISP 200 (Step 512), which in turn can forward the EAP AUTH to, for example, a LAN in the ISP 200 (Step 514). The EAP AUTH can be received by the AAA server in the ISP 200, which can then authenticate the non-PEC communicating device 11A and respond with an authentication reply EAP REPLY (Step 520). The EAP REPLY can be received by the MC data zone 240 and tunneled to the AP 155 (Step 522) and forwarded to the non-PEC communicating device 11A (Step 524).

After receiving the EAP REPLY (Step 524), the non-PEC communicating device 11A can send an IP address request to the AP 155, requesting assignment of an IP address and networking parameters DHCP REQ (Step 530). The AP 155 can tunnel the DHCP REQ to the MC data zone 240 (Step 532), which in turn can forward the DHCP REQ to the DHCP server 370 in the ISP 200 (Step 534). The DHCP server 270 can assign an IP address and a response DHCP REPLY can be sent to the MC data zone 240, including an IP address and networking parameters (Step 540). The DHCP REPLY can be tunneled from the MC data zone 240 to the AP 155 (Step 542) and forwarded to the non-PEC communicating device 11A (Step 544).

After being authenticated and receiving an IP address and networking parameters, the non-PEC communicating device 11A can send an ICMP request (ICMP REQ) to the AP 155 (Step 550). The ICMP REQ can include, for example, operational information, an error message, or a ping such an ICMP ECHO_REQUEST data packet. The AP 155 can tunnel the ICMP REQ to the MC data zone 240 in the ISP 200 (Step 552), which in turn can forward the ICMP REQ to the access server or network manager in the ISP 200 (Step 554). The access server or network manager can respond with an ICMP REPLY to the MC data zone 240 (Step 560). The ICMP REPLY can include, for example, operational information, an error message, or an ICMP ECHO_REPLY packet in response to the ICMP ECHO_REQUEST data packet. The ICMP REPLY can be tunneled from the MC data zone 240 to the AP 155 (Step 562) and forwarded to the non-PEC communicating device 11A (Step 564).

A non-transitory computer readable medium can be provided containing a computer program, which when executed on one or more of the computing devices in the PEC system 100 or ISP 200, causes the connectivity flow shown in FIGS. 7 and 8 to be carried out by the PEC system 100 and/or ISP 200. The computer program can be tangibly embodied in the computer readable medium, comprising one or more program instructions, code segments, or code sections for performing each of the Steps 410 through 464 in FIG. 7 and Steps 510 through 564 in FIG. 8 when executed by one or more computing devices in the PEC system 100 or ISP 200.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, Wi-Fi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, Wi-Fi, WiMAX, IEEE 802.11, DECT, 0G, 1G, 2G, 3G, 4G, or 5G cellular standards, Bluetooth, or the like.

The term "transmission," as used in this disclosure, means the conveyance of signals via electricity, acoustic waves, light waves and other electromagnetic emissions, such as those generated in connection with communications in the radio frequency (RF) or infrared (IR) spectra. Transmission media for such transmissions can include coaxial cables, copper wire and fiber optics, including the wires that comprise a system bus coupled to the processor.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, a network model or the like. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. An enterprise network system for extending a public Wi-Fi hotspot of an Internet service provider network to a non-enterprise communicating device, the enterprise network system comprising:
   a processor;
   a storage device connected to the processor;
   a local area network that includes a firewall;
   an access point zone that broadcasts a service set identifier of the enterprise network system (PEC SSID) and a service set identifier of the Internet service provider network (ISP SSID); and
   a mobility controller zone that tunnels data packets between the access point zone and the Internet service provider network to securely transport data packets between the Internet service provider network and the non-enterprise computing device,
   wherein the mobility controller zone tunnels data packets from the access point zone to provide secure transport of data packets to and from an enterprise computing device, and
   wherein the access point zone comprises:
      a first access point that broadcasts the service set identifier of the enterprise network system (PEC SSID) and that communicates with the enterprise communicating device, transporting data packets to and from the enterprise communicating device; and
      a second access point that broadcasts the service set identifier of the Internet service provider network (ISP SSID) and that communicates with the non-enterprise communicating device, transporting data packets to and from the non-enterprise communicating device.

2. The enterprise network system of claim 1, wherein the mobility controller zone tunnels data packets to the Internet service provider network through the firewall.

3. The enterprise network system of claim 1, wherein the mobility controller zone comprises a mobility controller that is located in the Internet service provider network and integrated in the mobility controller zone.

4. The enterprise network system of claim 3, wherein the mobility controller zone comprises an other mobility controller.

5. The enterprise network system of claim 4, wherein the other mobility controller tunnels data packets to an other Internet service provider network.

6. The enterprise network system of claim 5, wherein the other mobility controller is located in the other Internet service provider network.

7. The enterprise network system of claim 1, wherein the access point zone comprises:
   a third access point that broadcasts a service set identifier of an other Internet service provider network (ISP2 SSID) and that communicates with an other non-enterprise communicating device, transporting data packets to and from the other non-enterprise communicating device,
   wherein the service set identifier of the Internet service provider network (ISP SSID) is different from the service set identifier of the other Internet service provider network (ISP2 SSID).

8. The enterprise network system of claim 1, wherein the mobility controller zone tunnels data packets to provide secure transport of data packets between the enterprise computing device and the local area network.

9. A method for extending a public Wi-Fi hotspot of an Internet service provider network to an enterprise network system and securely transporting data packets between a non-enterprise communicating device and the Internet service provider via a demilitarized zone in the enterprise network system, the method comprising:
   broadcasting a service set identifier of the enterprise network system (PEC SSID);
   broadcasting a service set identifier of the Internet service provider network (ISP SSID);
   tunneling data packets between an access point zone in the enterprise network system and a mobility controller in the Internet service provider network to securely transport data packets between the Internet service provider network and a non-enterprise computing device; and
   tunneling data packets between the access point zone and a mobility controller in the enterprise network system to securely transport data packets between a local area network in the enterprise network system and an enterprise computing device, wherein the access point zone comprises a first access point that broadcasts the service set identifier of the enterprise network system (PEC SSID) and a second access point that broadcasts the service set identifier of the Internet service provider network (ISP SSID);
   transporting, by the first access point and the mobility controller in the enterprise network system, data packets between the local area network and the enterprise communicating device; and
   transporting, by the second access point, data packets between the non-enterprise computing device and the mobility controller in the Internet service provider network.

10. The method of claim 9, wherein the tunneling the data packets between the access point zone in the enterprise network system and the mobility controller in the Internet service provider network comprises tunneling the data packets to the Internet service provider network through a firewall in local area network in the enterprise network system.

11. The method of claim 9, further comprising:
   receiving an authentication request from the non-enterprise communicating device at the access point zone; and
   tunneling the authentication request from the access point zone to the mobility controller in the Internet service provider network.

12. The method of claim 11, further comprising:
   forwarding the authentication request from the mobility controller to an AAA server in the Internet service provider network; and
   receiving an authentication reply from the AAA server at the mobility controller in the Internet service provider network.

13. The method of claim 12, further comprising:
   tunneling the authentication reply from the mobility controller to the access point zone to be forwarded to the non-enterprise communicating device.

14. A non-transitory computer readable medium having a plurality of sections of computer program code that, when executed a computing device, extend a public Wi-Fi hotspot of an Internet service provider network to an enterprise network system and securely transport data packets between a non-enterprise communicating device and the Internet service provider via a demilitarized zone in the enterprise network system, the computer readable medium comprising:
   a PEC SSID broadcasting code section that, when executed by the computing device, controls an access point to broadcast a service set identifier of the enterprise network system (PEC SSID);

an ISP SSID broadcasting code section that, when executed by the computing device, controls an other access point to broadcast a service set identifier of the Internet service provider network (ISP SSID);

an ISP tunneling code section that, when executed by the computing device, creates a secure channel and tunnels data packets between said other access point and a mobility controller in the Internet service provider network to securely transport data packets between the Internet service provider network and a non-enterprise computing device;

an PEC tunneling code section that, when executed by the computing device, creates a secure channel and tunnels data packets between the access point and a mobility controller in the enterprise network system to securely transport data packets between a local area network in the enterprise network system and an enterprise computing device;

a first transporting code section that, when executed by the computing device, causes transporting, by the first access point and the mobility controller in the enterprise network system, data packets between the local area network and the enterprise communicating device; and a second transporting code section that, when executed by the computing device, causes transporting, by the second access point, data packets between the non-enterprise computing device and the mobility controller in the Internet service provider network.

* * * * *